(12) United States Patent
Castelli et al.

(10) Patent No.: US 10,720,161 B2
(45) Date of Patent: Jul. 21, 2020

(54) METHODS AND SYSTEMS FOR PERSONALIZED RENDERING OF PRESENTATION CONTENT

(71) Applicant: INTERNATIONAL BUSINESS MACHINES CORPORATION, Armonk, NY (US)

(72) Inventors: Vittorio Castelli, Croton on Hudson, NY (US); Shikhar Kwatra, Durham, NC (US); Paul Krystek, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/136,071

(22) Filed: Sep. 19, 2018

(65) Prior Publication Data

US 2020/0090659 A1    Mar. 19, 2020

(51) Int. Cl.
| | |
|---|---|
| G10L 15/26 | (2006.01) |
| H04N 21/44 | (2011.01) |
| G06F 16/34 | (2019.01) |
| G06F 16/435 | (2019.01) |
| G06F 16/683 | (2019.01) |
| G06F 16/48 | (2019.01) |

(52) U.S. Cl.
CPC ............ *G10L 15/26* (2013.01); *G06F 16/345* (2019.01); *G06F 16/435* (2019.01); *G06F 16/48* (2019.01); *G06F 16/685* (2019.01); *H04N 21/44008* (2013.01)

(58) Field of Classification Search
CPC ..... H04L 67/14; H04L 65/1083; H04L 67/10; H04L 51/04; H04L 51/043; H04L 65/403; G03G 15/0291; H04M 3/565

USPC ............ 379/201.02, 201.05, 201.09, 202.01, 379/203.01, 204.01, 205.01, 206.01; 348/14.03, 14.07, 14.08

See application file for complete search history.

(56) References Cited

U.S. PATENT DOCUMENTS

| | | | |
|---|---|---|---|
| 8,649,494 B2 | 2/2014 | Basson et al. | |
| 8,767,935 B2 * | 7/2014 | Gartner ................ | H04M 3/565 379/158 |
| 9,607,615 B2 | 3/2017 | Han et al. | |
| 10,182,109 B2 * | 1/2019 | Midtun ............... | H04L 12/1827 |
| 10,511,643 B2 * | 12/2019 | Faulkner ............... | H04M 3/563 |
| 2002/0078090 A1 | 6/2002 | Hwang et al. | |
| 2010/0042647 A1 * | 2/2010 | Schultz ............... | H04L 12/1831 379/85 |

(Continued)

OTHER PUBLICATIONS

Yang et al., "Personalized Text Content Summarizer for Mobile Learning: An Automatic Text Summarization System with Relevance Based Language Model," 2012 IEEE Fourth International Conference on Technology for Education, 2012 (8 pages).

*Primary Examiner* — Binh Kien Tieu
(74) *Attorney, Agent, or Firm* — Griffiths & Seaton PLLC

(57) ABSTRACT

Embodiments for rendering content, such as a teleconference, by one or more processors are described. A personalized presentation rendering profile for at least one individual is received. Portions of the content are selected based on the personalized presentation rendering profile. A rendering of the content is caused to be generated. The rendering of the content includes rendering the selected portions of the content in a manner different than other portions of the content.

15 Claims, 5 Drawing Sheets

(56) References Cited

U.S. PATENT DOCUMENTS

| | | | |
|---|---|---|---|
| 2011/0060591 A1* | 3/2011 | Chanvez | H04M 3/2281 |
| | | | 704/270 |
| 2012/0224021 A1 | 9/2012 | Begeja et al. | |
| 2013/0325972 A1 | 12/2013 | Boston et al. | |
| 2014/0108499 A1* | 4/2014 | Midtun | H04L 12/1827 |
| | | | 709/203 |
| 2014/0192141 A1* | 7/2014 | Begeja | H04N 7/147 |
| | | | 348/14.08 |
| 2014/0280614 A1 | 9/2014 | Alakuijala et al. | |
| 2014/0372909 A1* | 12/2014 | Buford | G06F 3/0481 |
| | | | 715/753 |
| 2015/0181020 A1* | 6/2015 | Fitzsimmons | H04M 3/42221 |
| | | | 379/67.1 |
| 2017/0018272 A1 | 1/2017 | Lee et al. | |
| 2018/0035072 A1* | 2/2018 | Asarikuniyil | H04N 21/8126 |
| 2018/0205797 A1* | 7/2018 | Faulkner | H04L 67/14 |
| 2018/0336001 A1* | 11/2018 | Abuelsaad | G06F 3/165 |
| 2018/0336902 A1* | 11/2018 | Cartwright | G06F 40/30 |
| 2018/0337963 A1* | 11/2018 | Faulkner | H04L 12/1822 |
| 2018/0352187 A1* | 12/2018 | Asarikuniyil | H04N 21/8126 |
| 2019/0082142 A1* | 3/2019 | Pell | H04N 7/147 |

* cited by examiner

METHODS AND SYSTEMS FOR PERSONALIZED RENDERING OF PRESENTATION CONTENT

BACKGROUND OF THE INVENTION

Field of the Invention

The present invention relates in general to computing systems, and more particularly, to various embodiments for rendering content, such as teleconferences, in a personalized manner.

Description of the Related Art

Various presentations, such a teleconferences (e.g., audio and/or video), are often attended and/or viewed by numerous people. For example, a teleconference being held by a company may be listened to by hundreds, perhaps even thousands, of the company's employees or shareholders. Often, only portions of the content of the teleconference is relevant to at least some of the listeners. For instance, an employee who works in the accounting department of the company may find that the only portions of the teleconference that are at all relevant to him/her are associated with the financial status of the company, policies related to accounting, etc.

However, in order to ensure that he/she "catches" the relevant portions of the teleconference, the employee is often required to listen to the entire teleconference, as there is typically no way for them to know exactly when those topics will be discussed. Such a situation may be very inefficient, as the employee could be performing other tasks related to his/her work during the portions of the teleconference that are not relevant to them.

SUMMARY OF THE INVENTION

Various embodiments for rendering a teleconference by one or more processors are described. In one embodiment, by way of example only, a method for rendering a teleconference, again by one or more processors, is provided. A personalized presentation rendering profile for at least one individual is received. Portions of a teleconference are selected based on the personalized presentation rendering profile. A rendering of the teleconference is caused to be generated. The rendering of the teleconference includes rendering the selected portions of the teleconference in a manner different than other portions of the teleconference.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
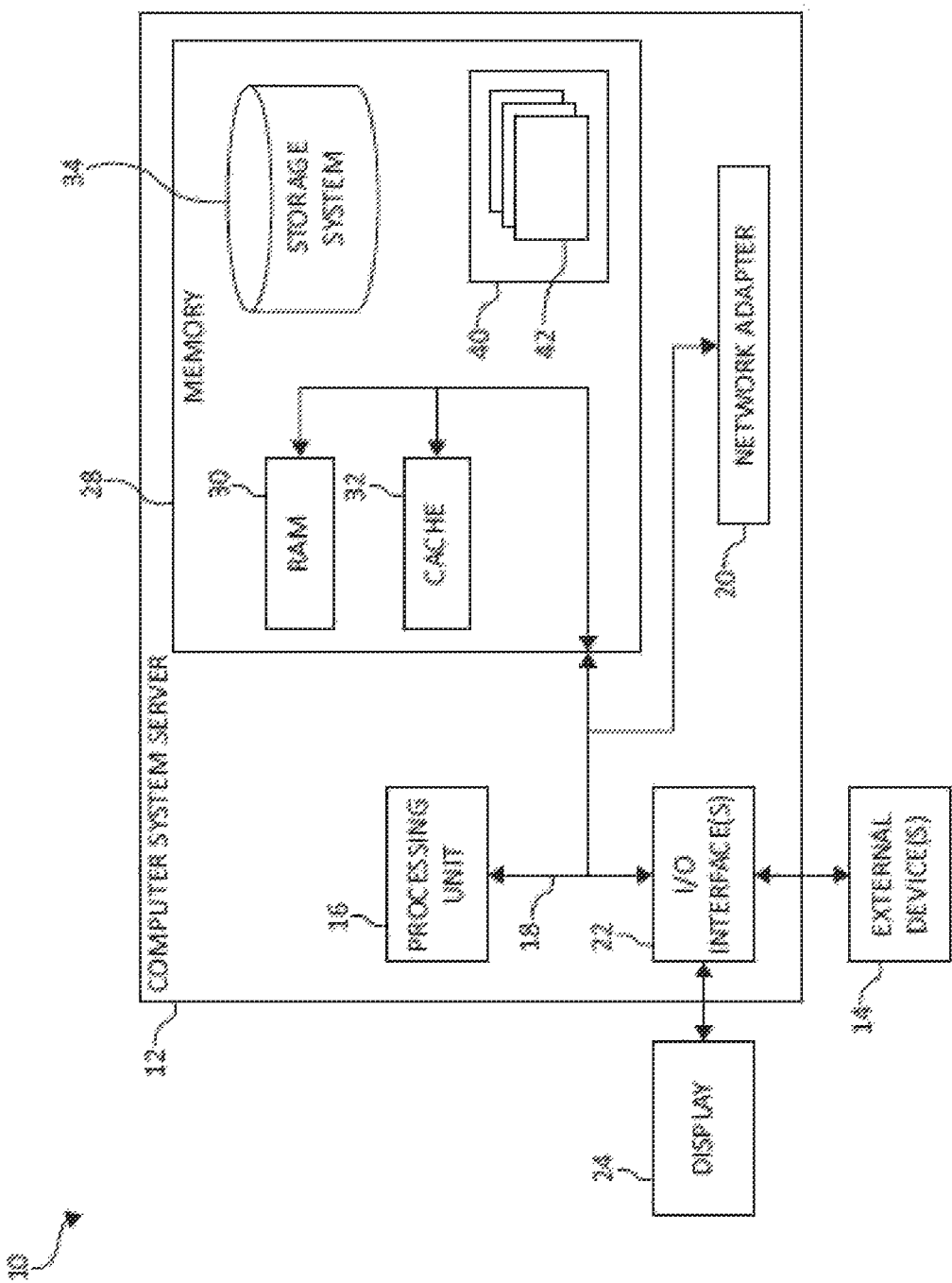
FIG. 1 is a block diagram depicting an exemplary computing node according to an embodiment of the present invention.

As discussed above, various presentations, such a teleconferences or conference calls (e.g., audio and/or video conferences), are often attended and/or viewed by numerous people. For example, a teleconference being held by a company may be listened to by hundreds, perhaps even thousands, of the company's employees or shareholders. Often, only portions of the content of the teleconference is relevant to at least some of the listeners.

For instance, an employee who works in the accounting department of the company may find that the only portions of the teleconference that are at all relevant to him/her are associated with the financial status of the company, policies related to accounting, etc. Likewise, an employee who works in the human resources department of the company may only have an interest in the portions of the teleconference related to hiring procedures, while a shareholder may only want to know about the company's earnings, profits, etc. during the most recent quarter.

However, in order to ensure they "catch" the portions of the teleconference that are relevant to them, listeners are often required to listen to the entire teleconference, as there is typically no way for them to know exactly when those topics will be discussed. Such a situation may be very inefficient. For example, employees could be performing other tasks related to their work during the portions of the teleconference that aren't relevant to them.

Similar inefficiencies may be found when individuals consume (e.g., listen to, watch, read, etc.) other types of presentations or content. As such, it should be understood that the methods and system described herein may be applied to various types of presentations or content besides teleconferences, such as speeches, reading material (e.g., including brail), slide presentations, videos, etc., which may be rendered in different manners, such as audio and/or video content (e.g., live streaming or recorded/stored files) and various digital files, such as text files, images, and slides.

In view of the foregoing, a need exists for methods and systems that allow for presentation material or content and/or the manner in which the material is presented or rendered to be tailored to individuals experiencing or consuming (e.g., listening to, watching, reading, etc.) it.

To address these needs, embodiments described herein provide methods and systems for rendering content of presentations, such as teleconferences, in a way that is based on information (e.g., a personalized presentation rendering profile or "cognitive profile") associated with the individual (s) experiencing it (e.g., their position/job/role at a company, personal interests, schedule, keywords or key phrases in electronic communications, social media activity, etc.).

In some embodiments, the methods and systems described herein provide identification, storing, and summarization of content in a presentation, such as a teleconference, that is (at least relatively) relevant to a particular individual (or user) or group of individuals. In some embodiments, a cognitive method (and/or a method/system using a cognitive analysis) is provided which detects content relevant to an individual (or group of individuals) and, over time, builds on the previously detected relevant content (e.g., via user feedback).

In some embodiments, while the content is being presented (e.g., during a teleconference), the manner in which the content is rendered may be changed in "real-time" based on the relevance of the content to the individual(s). For example, during a teleconference (e.g., audio only, audio and video, etc.), the volume at which the content is rendered may be increased for portions of the teleconference that are determined to be relatively important for the individual, while other portions of the teleconference may be rendered at a reduced volume or with no volume (e.g., the volume is "muted").

In some embodiments, a summary (e.g., shortened, truncated, etc. version) of the content may be generated and provided (e.g., sent) to the individual(s) in, for example, text form or as an audio and/or video file. The summary may include a higher level of detail (e.g., a more detailed description) for the portion(s) of the content that are determined to be relatively relevant to the individual compared to the other portion(s) of the content. The summary may contain annotated (e.g., visual or audible) topic titles to indicate to the individual(s) why the information (or that content) is relevant. The annotations may include a relative importance indicator (e.g., an indication of a percentage, a score, etc.). Individuals may be able to set a relevance threshold to access a summary of the content customized to the level of relevance they are interested to have summarized. In some embodiments, the content relevant to a particular individual may be summarized and provided to the individual in real-time or after the initial presentation of the content (e.g., after a teleconference).

As such, individuals may be able to continue performing other tasks without wasting time listening to/watching the initial, complete presentation of the content, much of which is most likely of little relevance to them. In some embodiments, the portion(s) of the content that are determined to be relevant to the individual(s) may be stored in a database (e.g., on the cloud). In some embodiments, notifications may be sent to various devices (e.g., a mobile phone, tablet, etc.) indicating that content relevant to that individual is being presented. For example, when the topic of conversation during a teleconference is determined to be relevant to a particular individual, a notification may be sent to the individual's mobile phone and/or the audio feed of the teleconference maybe (automatically) rendered by the mobile phone.

Thus, it should be understood that the methods and systems described herein may provide a personalized (or customized) rendering of the content in various ways. As mentioned above, when the content is a teleconference (or other form of "streaming" audio and/or video), for portions of the teleconference that are determined to be relatively unimportant or irrelevant for a particular individual, the device rendering the teleconference (e.g., a mobile phone, landline phone, etc.) may be in a "sleep" (or low power) and/or low volume mode. When the system detects that the teleconference is covering (or is about to cover) topics that are relevant to the individual (and/or the individual may be expected to speak or actively take part in the teleconference), the device may switch to a regular operating and/or high(er) volume mode, perhaps with enough warning (or lead time) to allow the individual to be "up to speed" on the topic(s) being discussed. Such a method/system may provide the personalized rendering of the content in real-time.

However, in some embodiments, the personalized rendering is provided after the initial presentation of the content, such as after the teleconference. As mentioned above, a customized version of the audio (and/or video) may be provided, which includes, for example, a shortened version of the most relevant portions of the teleconference (or conference call), an indexed (e.g., audio and/or text) version of the teleconference that is sorted by the topic(s) discussed with most relevant portions highlighted, an indexed version of the teleconference that is sorted by the topic(s) discussed with the topic(s) ranked with a relevancy score (or grade), and/or an indexed version of the teleconference sorted by the topic(s) discussed with the topics ranked with a relevancy score, where playback options (e.g., audio, video, and/or text) allow individual to play back all indexed portions based on a relevancy threshold that is selected by the individual (and/or controlled by a system setting).

In some embodiments, a cognitive analysis is used to generate a profile for the individual(s) (e.g., based on various sources of data associated with the individual(s) and determine which portion(s) of the content are relatively relevant to the individual(s) and/or determine a relevancy score or grade for different portions of the content. The cognitive analysis may include classifying natural language, analyzing tone, and analyzing sentiment (e.g., scanning for keywords, key phrases, etc.) with respect to, for example, the data sources associated with the individual(s) and/or the content (e.g., a teleconference). Over time, the methods and systems described herein may determine correlations (or insights) that allow for an improvement in the determining of the relevancy of content for users, perhaps with feedback provided by the users, that allows for the performance of the system to improve with continued use.

As such, in some embodiments, the methods and/or systems described herein may utilize a "cognitive analysis," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the relevancy of content, such as teleconferences, for individuals. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method for rendering a teleconference (or other type of content) by one or more processors is provided. A personalized presentation rendering profile (e.g., "cognitive profile" as used herein) for at least one individual is received. Portions of a teleconference are selected based on the personalized presentation rendering profile. A rendering of the teleconference is caused to be generated. The rendering of the teleconference includes rendering the selected portions of the teleconference in a manner different than other portions of the teleconference.

The personalized presentation rendering profile may be based on at least one data source associated with the individual and may be generated utilizing a cognitive analysis. The rendering of the teleconference may be caused to be generated during the teleconference or after the teleconference.

The rendering of the teleconference may include at least one of generating text, rendering audio content, rendering video content, or a combination thereof.

If the rendering of the teleconference includes generating text, the generated text may include a first type of description associated with the selected portions of the teleconference and a second type of description associated with the other portions of the teleconference. The first type of description may be more detailed than the second type of description.

If the rendering of the teleconference includes rendering audio content, the rendering of the audio content may include rendering audio content associated with the selected portions of the teleconference at a first volume and rendering audio content associated with the other portions of the teleconference at a second volume. The first volume may be greater than the second volume.

The receiving of the personalized presentation rendering profile for at least one individual may include receiving a respective personalized presentation rendering profile for each of a plurality of individuals. The selecting of the portions of the teleconference may be performed for each of the plurality of individuals based on the respective personalized presentation rendering profile and include detecting keywords in the selected portions based on the respective personalized presentation rendering profile. The causing of the rendering of the teleconference to be generated may be performed for each of the plurality of individuals and may be based on the detected keywords.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of implementing and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, mobile electronic devices (e.g., mobile phones, PDAs, laptop devices, etc.), network PCs, and servers. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
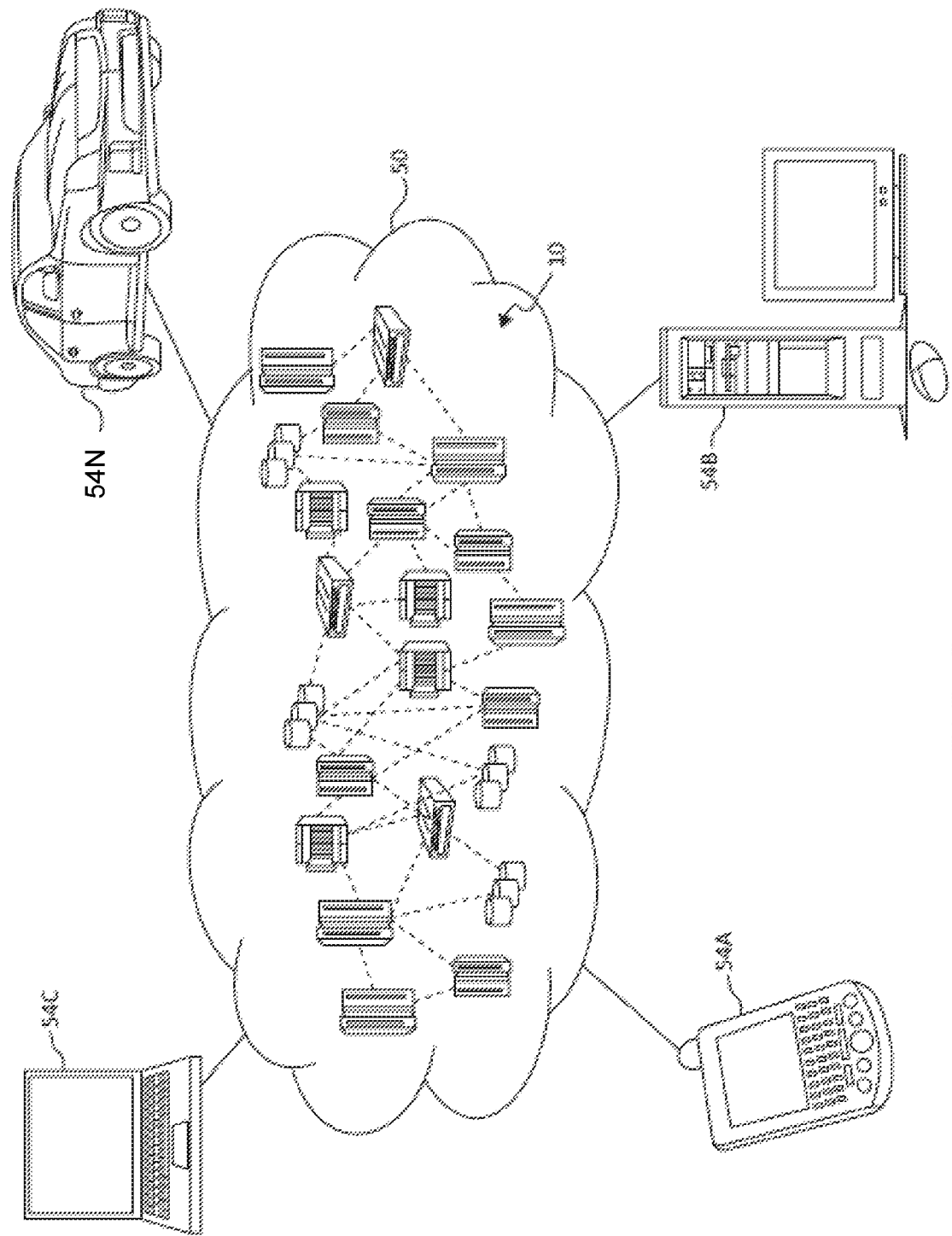
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
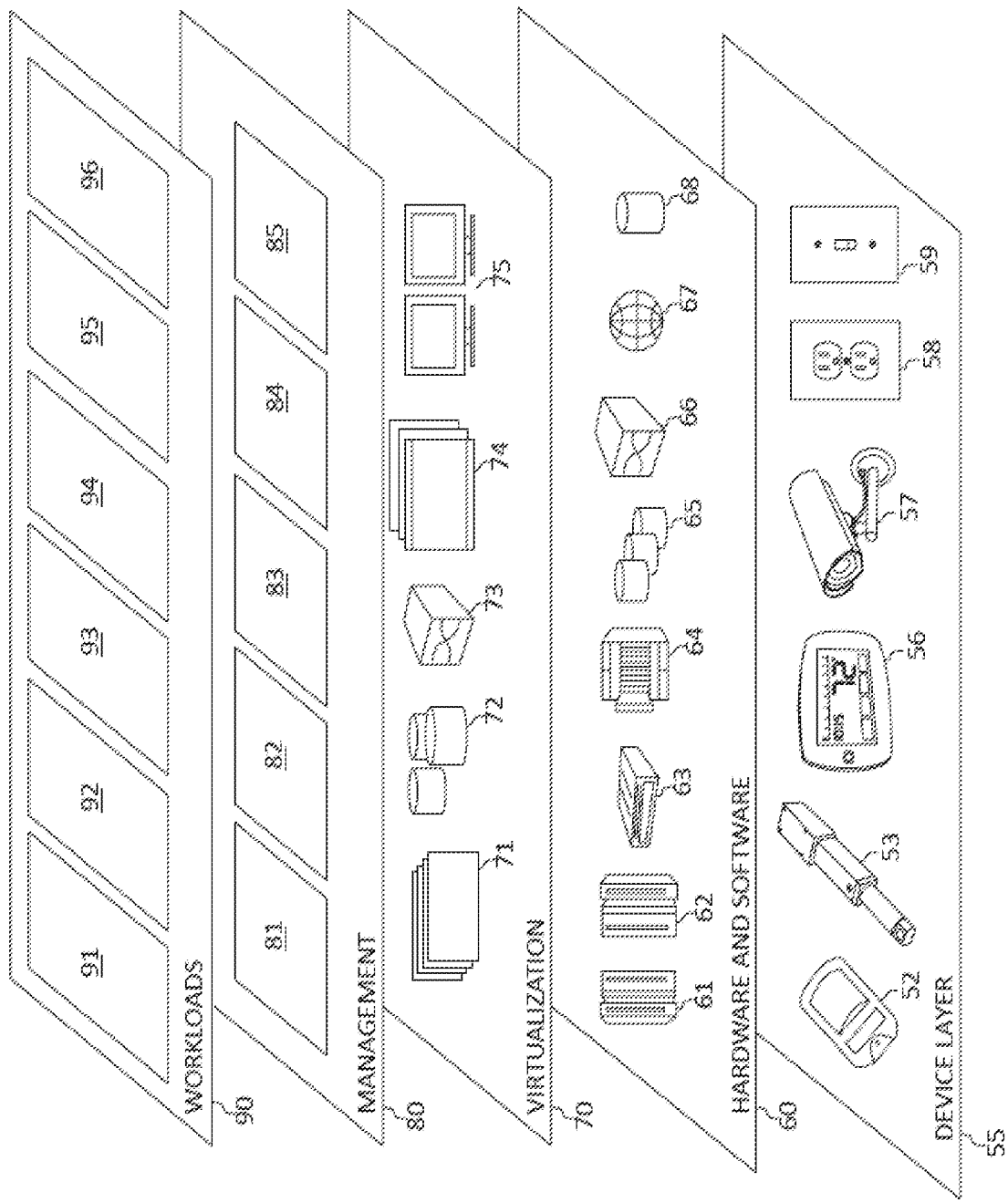
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for rendering content as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for rendering content, such as a teleconference or conference call, in a personalized or customized manner based on information (e.g., a personalized presentation rendering profile or "cognitive profile") associated with the individual(s) experiencing it (e.g., their position/job/role at a company, personal interests, schedule, keywords or key phrases in electronic communications, social media activity, etc.).

In some embodiments, a user (or individual) or group of users is first identified. The identification of the user(s) may include the user registering with a system, creating an account, etc. or may be performed automatically (e.g., based on the user's association with an organization, employment at a company, etc.). Data (or information) sources associated with the user are then identified and scanned or monitored for topics, subjects, etc. that may be of interest, relevant, important, etc. for the user (or users) to, for example, generate a personalized presentation rendering profile (e.g., a "cognitive profile") for the user.

The data sources may include any appropriate data sources associated with the user that are accessible by the system (perhaps with the permission or authorization of the user). Examples of such data sources include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases. It should be noted that in some embodiments some users may have roles beyond those related to work or family, such as a role within an interest group. Group interests may be an aggregate of the common and most relevant topics of a user group (e.g., as indicated within a social media group). Topics of interest also include connected relationships, such as a company reporting structure (e.g., a user may be considered to be interested in anything discussed by a more senior employee in their reporting structure), or anything to do with their immediate family members or close friends.

In some embodiments, natural language processing (NLP) keyword extraction is used to extract and store relevant topics (e.g., in a cloud database which is integrated with the respective users who are engaged in that specific topic of interest) from the data source (and/or the content, as described below). In some embodiments, mel-frequency cepstrum coefficients (MFCCs), as are commonly understood, are used to extract speech features and match speech features to recognize individuals that are speaking at a particular time (e.g., during a teleconference) and individuals that might be mentioned (e.g., by name in a teleconference).

Using such information, a confidence level (or grade or score) may be determined based on features mentioned (e.g., audible words or written text), and tags may be created with respect to the specific user and their voices so that the relevance may be established. In some embodiments, a syntactic analysis is used. For example, a speech expressions may be compared to content fields to identify matching patterns that may include user information and user content, which may be domain (or topic) specific if the user usually deals in a specific domain (e.g., type of work). Also, terms often used in association with a regular expression may be correlated, and if located, may designate a match.

In some embodiments, a semantic analysis may (also) be used. For example, the terms and/or words in the initial information (or content) may be analyzed (or monitored) for terms that are deemed to be correlated to a specific user (e.g., from a matching repository). Also, statistical clustering and classification methods may be used to extract contextual or audio-based conversation information features, index the feature space, and classify the individual's information and other pieces of information into semantic categories. Further, k-means clustering, as is commonly understood, may be used to cluster data. A weighted variation of Euclidean distance may be used for phrase comparison. The Euclidean distance may compare all components in the feature vector with equal weightings and have a low computational complexity.

Using such, a correlation (or correlations) between user interests, topics of relevance, etc. and the content (or at least portions thereof) may be established. In some embodiments, the history (and/or feedback) of the user is utilized (e.g., in combination with the cognitive profile thereof), such as monitoring the user's response with respect to specific portions of the content (e.g., the user's activity during the teleconference or other content).

In some embodiments, when one or more portions of the content has been determined to the relevant to the user (and/or such content has been detected), those portions of the content are rendered in a manner different than that of the other portions of the content. For example, in some embodiments, a description (e.g., a summary) of the content is (and/or selected portions are) provided (e.g., in audio, video, and/or text form), with the portions determined to be relevant to the user being described in greater detail than the other portions of the content. In some embodiments, portions of the content that are considered to be relatively irrelevant (or unimportant) to the user may be completely omitted from the description and/or the generated rendering (e.g., an introductory portion of a teleconference may be completely omitted).

In some embodiments, the customized rendering is provided in real-time. For example, as described above, in a teleconference or other type of "live" content, the system may adjust the volume of the speaker of the device being used (e.g., relatively low volume for portions of the content that are relatively irrelevant to the user and relatively high volume for portions that are determined to be relevant, which may be set by the user). In some embodiments, the user may be provided with an indication of when relevant content is being presented. For example, during a teleconference that the user is not currently listening to (or dialed into), he/she may receive a notification (e.g., via a text message or pop-up window on a mobile device) that topics relevant to them are being discussed and/or are about to be discussed. Similarly, the user may be provided with relatively brief portions of the content that are determined to be relevant, perhaps in real-time or after a delay (e.g., an audio or video file saved on a database, the cloud, etc. as it has been determined to include content relevant to the user).

In some embodiments, various devices associated with the user (e.g., mobile phones, laptops, wearable devices, etc.), as well as other data sources such as newsfeeds, current events, etc., may be monitored to adjust the topics which may be relevant to the user (e.g., adjust the user's cognitive profile). For example, if the user has read several online stories related to a current event, such information may be used to adjust the user's cognitive profile. In doing so, the system may utilize a "rigidity factor," which may be set by the user, such that adjustments may be made relatively quickly, reactively or over time (e.g., when the user's data indicates repeated occurrences of a particular piece of data). In some embodiments, the user may be able to define (or input) particular topics of interest (e.g., as opposed to having the system learn of such over time).

Figure 4:
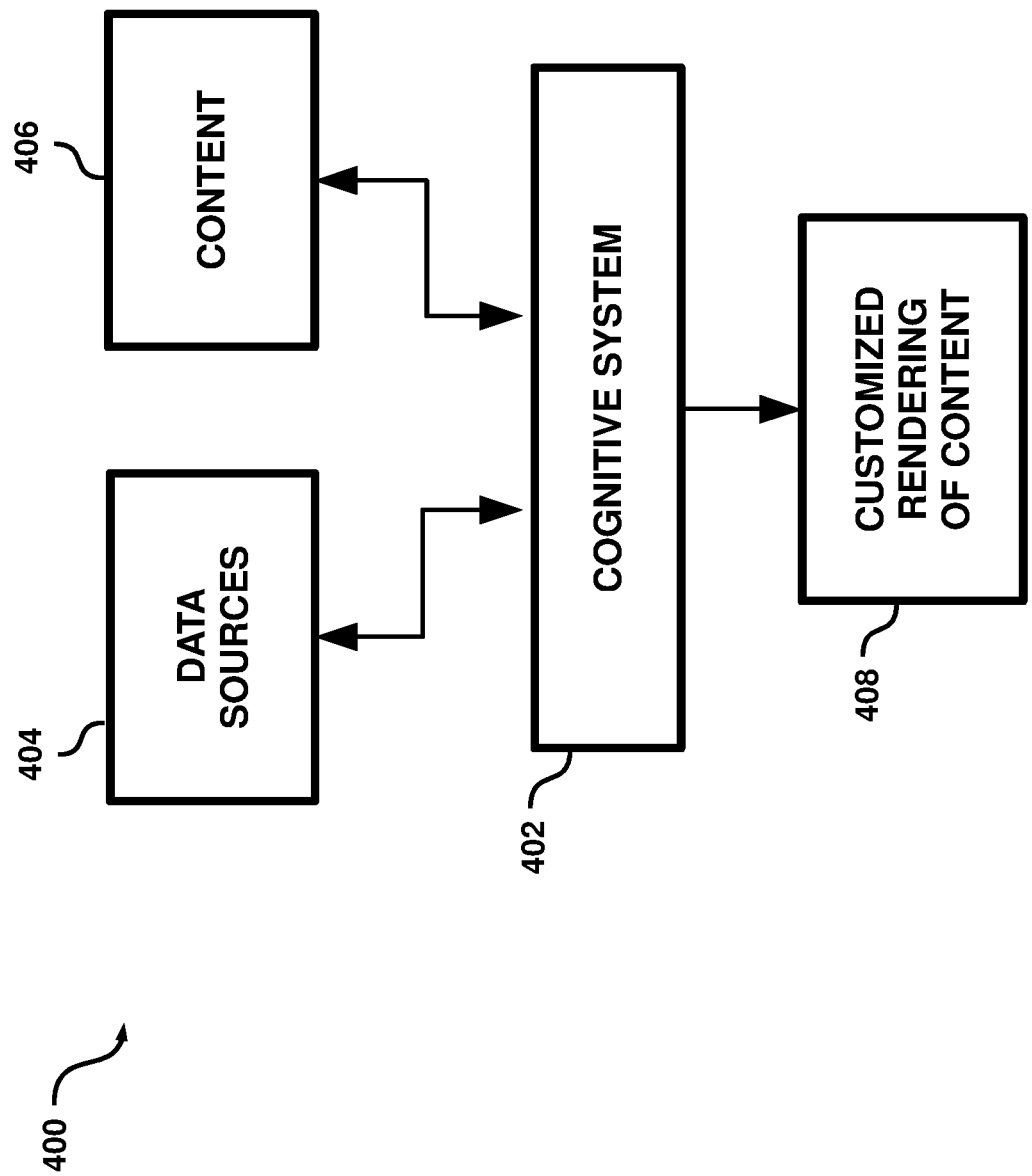
FIG. 4 is a functional/block diagram of a system in which various aspects of embodiments of the present invention may be implemented.

Referring to FIG. 4, a functional/block diagram of a system 400 is illustrated, in which various aspects of embodiments of the present invention may be implemented. The system 400 includes a cognitive system 402, data sources 404, and content 406. The cognitive system 402 may include (and/or be implemented within) any suitable computing system and/or device, such as those described above, that is capable of and/or configured to perform the various aspects of functionality described herein.

The data sources 404 may include any sources of data or information associated with a user (or individual) or group of users, which are suitable for determining topics, interests, etc. that may be relevant or important to the user(s). Examples of such data sources 404 include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases. The data sources 404 are accessible by (and/or in operative communication with) the cognitive system 402.

The content 406 may include any type of content (or presentation) that is to be consumed (e.g., listened to, viewed, read, etc.) by the user (or users). The content 406 may include audio content, video content, and/or reading material. In some embodiments, the content 406 includes a teleconference or conference call (e.g., audio teleconference or video conference). In some embodiments, the content 406 is monitored and/or scanned (or received or retrieved) by the cognitive system 402 (e.g., in real-time and/or after the initial presentation of the content). In some embodiments, the content 406 includes multiple portions or sections, which may be determined by the cognitive system 402 (e.g., the portions of the content 406 may be determined by the cognitive system 402 determining the "breaks" between different topics being presented or discussed).

In some embodiments, the data sources 404 are monitored and/or scanned (or received or retrieved) by the cognitive system 402 to generate, for example, a cognitive profile (e.g., the personalized presentation rendering profile) of the user(s). As described above, the cognitive profile may include a list of topics or subjects that have been determined to be (relatively) relevant or important to the user(s). As the cognitive system 402 monitors the content 406, portions thereof that are determined to be relevant, such as by the identification of keywords, key phrases, etc. (e.g., a "bag-of-words" model), to the user(s) are marked (or tagged or flagged) and/or otherwise indicated in a manner to differentiate those portions of the content 406. In some embodiments, a relevancy score or grade is determined for each of the portions of the content 406. The score (or grade) may be a numerical score on any suitable scale (e.g., a percentage) and/or another indicator of the relevancy or importance of the portions of the content 406 (e.g., "high relevancy," "medium relevancy," "low relevancy," etc.).

In some embodiments, the cognitive system 402 generates (or causes to be generated) a customized rendering of the content 408 based on, for example, the cognitive profile (e.g., personalized presentation rendering profile) of the user(s)). As described above, the rendering 408 of the content may include rendering the portion(s) of the content 406 that have been determined to be relatively relevant to the user(s) in a manner different than the other portion(s) of the content 406.

For example, in embodiments in which the content 406 is a teleconference (or any other presentation that is viewed by some individuals in real-time), the portion(s) of the teleconference that are determined to have relatively low relevancy or importance for the particular user(s) may be rendered (e.g., by a speaker on a computing device) at a low volume setting (or muted) and/or the device rendering the content may be maintained in a low power (or power saving mode). However, the portion(s) of the teleconference that are determined to have a relatively high relevancy or important for the particular user(s) may be rendered at a high(er) volume setting. As such, in some embodiments, the customized rendering 408 of the content may be provided to the user(s) in real-time (e.g., as the teleconference is taking place).

In some embodiments, the rendering 408 of the content includes generating a summary of the content 406 (e.g., in audio, video, and/or text form). The summary may include a relatively detailed (or first type of) description for the portion(s) of the content 406 that are determined to be relevant to the user and a less detailed (or second type of) description for the other portion(s) of the content 406. As such, in some embodiments, the customized rendering 408 of the content may be provided to the user(s) after the initial presentation of the content 406 (e.g., after the completion of the teleconference). It should be noted that using the methods and systems described herein, a customized or personalized rendering of the content 406 may be provided to each of a plurality of users or each of a plurality of groups of users (e.g., based on the respective cognitive profile thereof).

In some embodiments, the user(s) are provided with the ability to provide feedback to the system regarding, for example, the accuracy of the selection of portion(s) of the content 406 (e.g., via an application, text messaging, etc.). For example, if the user(s) believes that at least some of the content 406 that was improperly determined to be relevant to the user(s), the user(s) may indicate such, thus allowing the system to improve performance over time.

Figure 5:
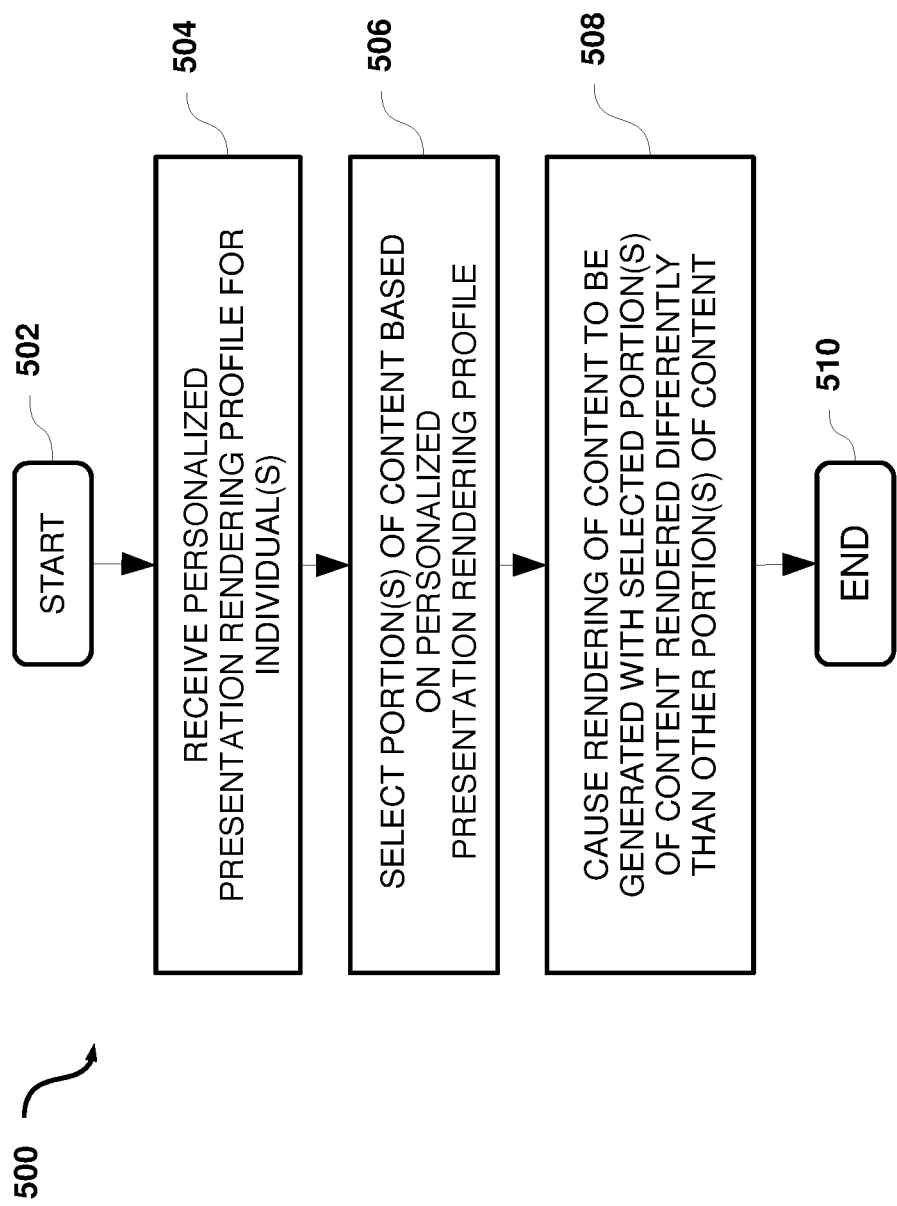
FIG. 5 is a flowchart diagram depicting an exemplary method for rendering content in which various aspects of the present invention may be implemented.

Turning to FIG. 5, a flowchart diagram of an exemplary method 500 for rendering content is illustrated. Method 500 begins (step 502) with, for example, one or more sources of data associated with a user (or group of users) being made accessible to (and/or being received or retrieved by) a computing system (or cognitive system), as described above.

A personalized presentation rendering profile (e.g., cognitive profile) for the user (or individual) is received (or retrieved or generated) (step 504). The personalized presentation rendering profile may be generated based on at least one data source associated with the user and may be generated utilizing a cognitive analysis. Examples of data sources associated with the user include a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases. The receiving (or generating) of the personalized presentation rendering profile may include receiving (or generating) a respective personalized presentation rendering profile for each of a plurality of users (or individuals).

Portions (or at least one portion) of a teleconference (or other type of content, such as described above) are selected based on the personalized presentation rendering profile (step 506). In particular, in some embodiments, portions of the teleconference that are determined to include topics of relevance or importance to the user, as indicated by the personalized presentation rendering profile thereof, are selected. In some embodiments, the portions are selected based on the identification or detection of keywords or key phrases in those portions. In embodiments involving multiple, distinct users (as opposed to a group of users), the selecting of the portions may be performed for each of the users based on the respective personalized presentation rendering profile thereof.

A rendering of the teleconference is caused to be generated (step 508). In some embodiments, the rendering of the teleconference includes rendering the selected portions of the teleconference in a manner different than other portions of the teleconference. The rendering of the teleconference may be caused to be generated during the teleconference (e.g., in real-time) or after the teleconference. The rendering of the teleconference may include at least one of generating text, rendering audio content, rendering video content, or a combination thereof. In embodiments involving multiple, distinct users (as opposed to a group of users), the causing of the rendering of the teleconference to be generated may be performed for each of the plurality of the users.

If the rendering of the teleconference includes generating text, the generated text may include a first type of description (or summary) associated with the selected portions of the teleconference and a second type of description associated with the other portions of the teleconference. The first type of description may be more detailed than the second type of description. If the rendering of the teleconference includes rendering audio content, the rendering of the audio content may include rendering audio content associated with the selected portions of the teleconference at a first (e.g., relatively high) volume and rendering audio content associated with the other portions of the teleconference at a second (e.g., relatively low) volume.

Methods 500 ends (step 510) with, for example, the rendering of the teleconference (or other type of content). In some embodiments, the user(s) is able to provide feedback regarding the selection of portion(s) of the teleconference, allowing the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instruction.

The invention claimed is:

1. A method, by one or more processors, for rendering a teleconference comprising:

receiving a personalized presentation rendering profile for at least one individual;

selecting portions of a teleconference based on the personalized presentation rendering profile;

causing a rendering of the teleconference to be generated, wherein the rendering of the teleconference includes rendering the selected portions of the teleconference in a manner different than other portions of the teleconference; wherein the rendering of the teleconference includes rendering audio content, and wherein the rendering of the audio content includes rendering audio content associated with the selected portions of the teleconference at a first sound volume and rendering audio content associated with the other portions of the teleconference at a second sound volume, the first sound volume being greater than the second sound volume; and commensurate with switching from the other portions of the teleconference rendered at the second sound volume to the selected portions of the teleconference rendered at the first sound volume, generating and sending a notification to at least one device associated with the at least one individual indicating that the selected portions of the teleconference are occurring; wherein the notification indicating that the selected portions of the teleconference are occurring is generated using a cognitive analysis of the teleconference and the at least one individual such that the cognitive analysis identifies, by correlating content of the teleconference and characteristics known of the at least one individual, that the selected portions of the teleconference are relevant to the at least one individual notwithstanding whether the selected portions are explicitly noted as being relevant by user input.

2. The method of claim 1, wherein the personalized presentation rendering profile is based on at least one data source associated with the individual and is generated utilizing the cognitive analysis.

3. The method of claim 1, wherein the rendering of the teleconference is caused to be generated during the teleconference or after the teleconference.

4. The method of claim 1, wherein the rendering of the teleconference includes generating text, and wherein said generated text includes a first type of description associated with the selected portions of the teleconference and a second type of description associated with the other portions of the teleconference, the first type of description being more detailed than the second type of description.

5. The method of claim 1, wherein the receiving of the personalized presentation rendering profile for at least one individual includes receiving a respective personalized presentation rendering profile for each of a plurality of individuals, the selecting of the portions of the teleconference is performed for each of the plurality of individuals based on the respective personalized presentation rendering profile and includes detecting keywords in the selected portions based on the respective personalized presentation rendering profile, and the causing of the rendering of the teleconference to be generated is performed for each of the plurality of individuals and is based on the detected keywords.

6. A system for rendering a teleconference comprising:
at least one processor that
receives a personalized presentation rendering profile for at least one individual;
selects portions of a teleconference based on the personalized presentation rendering profile;
causes a rendering of the teleconference to be generated, wherein the rendering of the teleconference includes rendering the selected portions of the teleconference in a manner different than other portions of the teleconference; wherein the rendering of the teleconference includes rendering audio content, and wherein the rendering of the audio content includes rendering audio content associated with the selected portions of the teleconference at a first sound volume and rendering audio content associated with the other portions of the teleconference at a second sound volume, the first sound volume being greater than the second sound volume; and commensurate with switching from the other portions of the teleconference rendered at the second sound volume to the selected portions of the teleconference rendered at the first sound volume, generates and sends a notification to at least one device associated with the at least one individual indicating that the selected portions of the teleconference are occurring; wherein the notification indicating that the selected portions of the teleconference are occurring is generated using a cognitive analysis of the teleconference and the at least one individual such that the cognitive analysis identifies, by correlating content of the teleconference and characteristics known of the at least one individual, that the selected portions of the teleconference are relevant to the at least one individual notwithstanding whether the selected portions are explicitly noted as being relevant by user input.

7. The system of claim 6, wherein the personalized presentation rendering profile is based on at least one data source associated with the individual and is generated utilizing the cognitive analysis.

8. The system of claim 6, wherein the rendering of the teleconference is caused to be generated during the teleconference or after the teleconference.

9. The system of claim 6, wherein the rendering of the teleconference includes generating text, and wherein said generated text includes a first type of description associated with the selected portions of the teleconference and a second type of description associated with the other portions of the teleconference, the first type of description being more detailed than the second type of description.

10. The system of claim 6, wherein the receiving of the personalized presentation rendering profile for at least one individual includes receiving a respective personalized presentation rendering profile for each of a plurality of individuals, the selecting of the portions of the teleconference is performed for each of the plurality of individuals based on the respective personalized presentation rendering profile and includes detecting keywords in the selected portions based on the respective personalized presentation rendering profile, and the causing of the rendering of the teleconference to be generated is performed for each of the plurality of individuals and is based on the detected keywords.

11. A computer program product for rendering a teleconference by one or more processors, the computer program product comprising a non-transitory computer-readable storage medium having computer-readable program code portions stored therein, the computer-readable program code portions comprising:
an executable portion that receives a personalized presentation rendering profile for at least one individual;

an executable portion that selects portions of a teleconference based on the personalized presentation rendering profile;

an executable portion that causes a rendering of the teleconference to be generated, wherein the rendering of the teleconference includes rendering the selected portions of the teleconference in a manner different than other portions of the teleconference; wherein the rendering of the teleconference includes rendering audio content, and wherein the rendering of the audio content includes rendering audio content associated with the selected portions of the teleconference at a first sound volume and rendering audio content associated with the other portions of the teleconference at a second sound volume, the first sound volume being greater than the second sound volume; and an executable portion that, commensurate with switching from the other portions of the teleconference rendered at the second sound volume to the selected portions of the teleconference rendered at the first sound volume, generates and sends a notification to at least one device associated with the at least one individual indicating that the selected portions of the teleconference are occurring; wherein the notification indicating that the selected portions of the teleconference are occurring is generated using a cognitive analysis of the teleconference and the at least one individual such that the cognitive analysis identifies, by correlating content of the teleconference and characteristics known of the at least one individual, that the selected portions of the teleconference are relevant to the at least one individual notwithstanding whether the selected portions are explicitly noted as being relevant by user input.

12. The computer program product of claim 11, wherein the personalized presentation rendering profile is based on at least one data source associated with the individual and is generated utilizing the cognitive analysis.

13. The computer program product of claim 11, wherein the rendering of the teleconference is caused to be generated during the teleconference or after the teleconference.

14. The computer program product of claim 11, wherein the rendering of the teleconference includes generating text, and wherein said generated text includes a first type of description associated with the selected portions of the teleconference and a second type of description associated with the other portions of the teleconference, the first type of description being more detailed than the second type of description.

15. The computer program product of claim 11, wherein the receiving of the personalized presentation rendering profile for at least one individual includes receiving a respective personalized presentation rendering profile for each of a plurality of individuals, the selecting of the portions of the teleconference is performed for each of the plurality of individuals based on the respective personalized presentation rendering profile and includes detecting keywords in the selected portions based on the respective personalized presentation rendering profile, and the causing of the rendering of the teleconference to be generated is performed for each of the plurality of individuals and is based on the detected keywords.

* * * * *